United States Patent Office 2,911,620
Patented Nov. 3, 1959

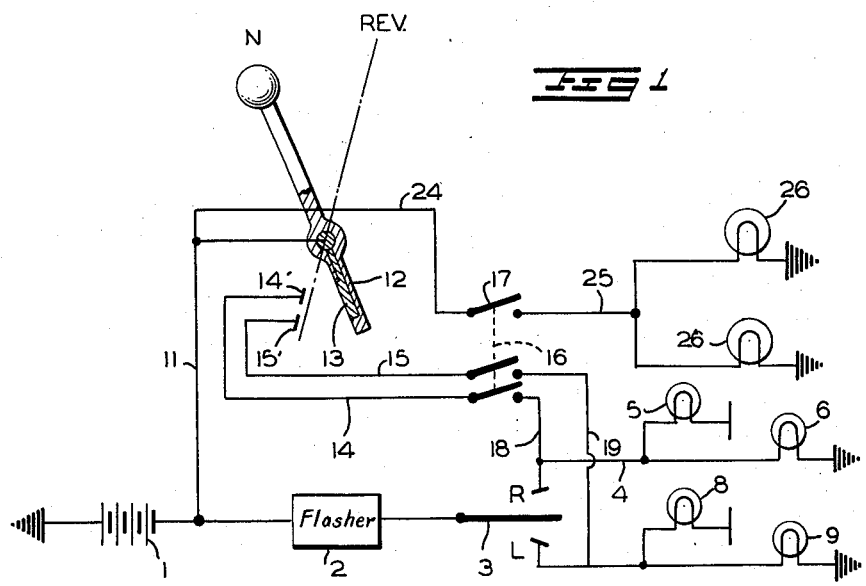
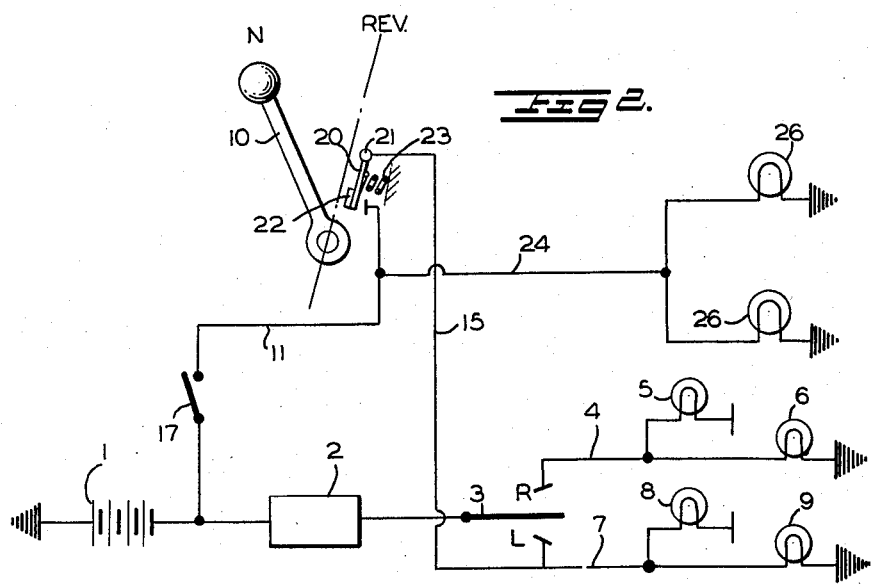

2,911,620

REVERSE DRIVING LIGHTS

Hans O. Scherenberg, Stuttgart-Heumaden, Germany, assignor to Daimler-Benz Aktiengesellschaft, Stuttgart-Unterturkheim, Germany Application August 17, 1954, Serial No. 450,396

Claims priority, application Germany August 17, 1953

5 Claims. (Cl. 340—74)

The present invention relates to a light system for motor vehicles, particularly for illuminating the area at the rear and rear sides of the car, as well as for serving as a warning signal when the car is to be driven in a reverse direction.

For illuminating the road as well as the free space available laterally of a truck or car when driving in reverse gear, for example, when entering a garage, special reverse-driving lights have previously been used which light up when the reverse gear is engaged. Such separate reverse-driving lights are rather expensive and also detract from the smooth, regular appearance of the car.

It is the object of the present invention to overcome these disadvantages and to provide as effective a reverse-driving light system as will ordinarily be needed, without requiring any separate light fixtures other than those which are ordinarily provided in the car.

A feature of the invention for attaining this object resides in a reverse-driving light system which utilizes lights of the regular flash or blinker system of a car as used for indicating the driving direction thereof, or at least the rear lights of such system.

Another object of the invention resides in automatically connecting such reverse-driving lights when the gear shift lever is moved to the reversing position.

Another object of the invention is to provide means for preventing the reverse-driving lights of the type described from lighting up unless the headlights of the car, or at least the parking lights, are also switched on.

Still another object of the invention is to provide means for automatically supplying a steady light, when the gear shift lever is placed in reverse, from the same lights which, for direction-indicating purposes, flash intermittently or provide blinker-type signals. Thus, the driver of the car, when engaging the reverse gear, will be able to see more clearly toward the rear and the sides of the car, and he will not be irritated by the blinking lights which might cause him to misjudge the space available for manipulating the car.

Further objects, features, and advantages of the invention will be apparent from the following detailed description thereof and the accompanying drawings, in which Fig. 1 shows a circuit diagram according to the invention; while Fig. 2 shows a simplified modification of the invention.

Referring to the drawings, the blinker circuit extends from the battery 1, one terminal of which is grounded, through the blinker mechanism 2, consisting, for example, of an automatic bimetallic circuit breaker, to the control switch 3 which may be manually operated to indicate the driving direction of the car and which in the drawing is shown in its neutral position. When turned in one direction, switch 3 engages with the contact "R", the intermittent current supplied by the mechanism 2 then passing through line 4 to the right front and rear blinker lights 5 and 6, while when turned in the other direction switch 3 engages with the contact "L" and the intermittent current then flows through line 7 to the left front and rear blinker lights 8 and 9.

As shown in Fig. 1, the gear shift lever 10 is provided with an extension 12 which constitutes an electric switch and carries a contact member 13 which is electrically insulated from the lever 10 and connected through line 11 to the battery 1, and is adapted to engage simultaneously a pair of contacts 14' and 15'. If the gear shift lever 10 is shifted from the neutral position "N" to the position "Rev" to engage the reversing gears, the current then flows from the battery 1 through line 11, contact 13, contacts 14' and 15' and lines 14 and 15 to a duplex switch 16 which is mechanically connected with the regular light switch 17 of the car. The lighting of the headlights 26 grounded to the body of the vehicle is controlled by lines 24, 25 and switch 17 interconnected with duplex switch 16. If the head lights of the car are turned on by means of switch 17 the duplex switch 16 will be closed so that the current then flows from lines 14 and 15 to lines 18 and 19, and then to all four blinker lights 5, 6, 8, and 9 which, as long as the reversing gear remains engaged and the headlights are switched on, furnish a steady light since the current is supplied thereto directly from the battery 1, by-passing the blinker mechanism 2 and the direction switch 3.

Thus, unless the main light switch 17 is also turned on, lights 5, 6, 8, and 9 may only be used as blinkers by the operation of the direction switch 3 and will not waste any current during the daytime by burning all the lights simultaneously and steadily when the gear shift lever is placed in the reversing position.

Fig. 2 illustrates a somewhat simplified circuit in which the normal blinker mechanism is merely by-passed by a line 11 leading through a switch 20 and a line 15 to the left blinker lights 8 and 9. Switch 20 may consist, for example, of a lever which is pivoted at one end about a stationary axis 21 and has at one side of the other end an elastic bumper 22 of insulating material, such as rubber, which is adapted to be engaged by the gear shift lever 10 when placed in the reversing position so as to be depressed against the action of a spring 23 to close switch 20 and thereby connect line 11 with line 15. Even though in this case only the blinker lights at the left side of the car, i.e. on the side nearest the driver's seat, will light up steadily, this will by most drivers be regarded as sufficient. In this figure the lighting of the grounded headlights 26 is controlled by lines 11 and 24 including the switch 17 in line 11.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. In combination with a motor vehicle having forward and reverse driving gears, means for selectively engaging said gears, headlights in said vehicle, switch means for energizing said headlights upon closure thereof, additional electric lights each having one filament adapted to operate alternately as turn indicator lights or as back-up lights to illuminate the road to the rear of the vehicle, said additional lights being located on opposite sides of a rear part of the vehicle to indicate the turning direction of the vehicle by selectively energizing one or the other of said additional lights, means for selectively and intermittently energizing the filaments of said additional lights for producing an intermittent optical light signal on one or the other side of the vehicle to indicate an intended turning direction of the vehicle, and means actuated by said shifting means for simultaneously energizing said filaments only upon closure of said switch means for energizing said headlights and upon engagement of the reverse driving gears to thereby continuously illuminate the road to the rear of the vehicle.

2. In combination with a motor vehicle having forward and reverse driving gears, means for selectively engaging said gears, headlights in said vehicle, switch means for energizing said headlights upon closure thereof, additional electric lights each having one filament adapted to operate alternately as turn indicator lights of the flashing type or as back-up lights to illuminate the road to the rear of the vehicle, said additional lights being located on opposite sides of a front part and a rear part of the vehicle to indicate a turning direction of the vehicle, by selectively energizing only the lights on one side or the other of the vehicle, means for intermittently and selectively energizing the filaments of the additional lights on one or the other side of the vehicle for producing an intermittent, flashing optical light-signal on one or the other side of the vehicle to indicate the intended turning direction of the vehicle, and means actuated by said shifting means for simultaneously energizing all of said filaments only upon closure of said switch means for energizing said headlights and upon engagement of the reverse driving gears to thereby uninterruptedly illuminate the road to the rear of the vehicle by the additional lights at said rear part of the vehicle.

3. In combination with a motor vehicle having selectable forward and reverse driving gears, gear selector means including a manually operated gearshift lever for selectively engaging said gears, headlights in said vehicle, means for energizing said headlights, additional light means having a circuit including a laterally spaced pair of lights at a forward end of the vehicle and a laterally spaced pair of lights at a rear end of the vehicle, each light having one filament adapted to operate in a dual capacity of turn indicator lights and backup lights to illuminate the road to the front and rear of the vehicle, said front and rear laterally spaced lights being located on opposite sides of the front part and the rear part of the vehicle respectively, to indicate a turning direction of the vehicle by selectively energizing only the lights on one side of the vehicle, means for intermittently and selectively energizing light filaments on one or the other side of the vehicle for producing an intermittent flashing optical light signal to indicate an intended turning direction of the vehicle, and means comprising an electrical switch operated by said gearshift lever for simultaneously energizing all of said additional lights upon engagement of the reverse driving gears to thereby uninterruptedly illuminate the road to the front and rear of the vehicle, said means for energizing said headlights including a regular light switch and a duplex switch in said light circuit mechanically connected to said light switch to energize the backup light filaments as backup lights only when said headlight switch means are closed.

4. In combination with a motor vehicle having forward and reverse driving gears, means for selectively engaging said gears, headlights in said vehicle, additional electric lights each having one filament adapted to operate alternately as turn indicator lights or as back-up lights to illuminate the road to the rear of the vehicle, said additional lights being located on opposite sides of a rear part of the vehicle to indicate the turning direction of the vehicle by selectively energizing one or the other of said additional lights for producing an intermittently optical light signal on one or the other side of the vehicle to indicate an intended turning direction of the vehicle, first switch means for said headlights, second switch means interconnected with said first switch means, third switch means actuated by said shifting means when said shifting means is in reverse gear drive position, and means for simultaneously energizing said filaments upon closure of said first, second and third switch means to thereby uninterruptedly illuminate the road to the rear of the vehicle.

5. In combination with a motor vehicle having a gear shift lever, headlights and directional lights located on opposite sides of the rear of the vehicle, means to intermittently operate the directional light on one or the other of said opposite sides in accordance with the turning direction of the vehicle, switch means for controlling said headlights, means for operating said directional lights in a continuous manner to illuminate the road to the rear of the vehicle, said last-mentioned means including switch means interconnected with said switch means for controlling said headlights and further including switch means closed by said gear shift lever when said lever is in reverse gear driving position.

References Cited in the file of this patent

UNITED STATES PATENTS

| | | |
|---|---|---|
| 2,040,923 | Doane | May 19, 1936 |
| 2,141,188 | Arbuckle | May 19, 1936 |
| 2,186,000 | Arbuckle | Jan. 9, 1940 |
| 2,238,394 | Murray | Apr. 15, 1941 |
| 2,669,704 | Hollins | Feb. 16, 1954 |

FOREIGN PATENTS

| | | |
|---|---|---|
| 647,499 | Great Britain | Dec. 13, 1956 |